United States Patent [19]
Pegg

[11] Patent Number: 5,175,665
[45] Date of Patent: Dec. 29, 1992

[54] LIGHTING RESISTANT COMPOSITE STRUCTURES

[75] Inventor: Leslie Pegg, Herts, England

[73] Assignee: British Aerospace Public Limited Company, London, England

[21] Appl. No.: 604,490

[22] Filed: Oct. 26, 1990

[30] Foreign Application Priority Data

Oct. 27, 1989 [GB] United Kingdom ............... 8924231

[51] Int. Cl.⁵ ............................................. B64C 1/12
[52] U.S. Cl. .................. 361/218; 244/1 A; 244/132
[58] Field of Search ............. 361/218, 212, 220, 117; 244/1 A, 131, 132; 174/2, 5 R

[56] References Cited

U.S. PATENT DOCUMENTS

| | | | |
|---|---|---|---|
| 4,502,092 | 2/1985 | Bannink, Jr. et al. | 361/218 |
| 4,755,904 | 7/1988 | Brick | 361/117 |
| 4,891,732 | 1/1990 | Jones | 361/218 |
| 4,905,931 | 3/1990 | Covey | 244/1 A |

FOREIGN PATENT DOCUMENTS

| | | | |
|---|---|---|---|
| 2391386 | 1/1979 | France | 244/132 |
| 2212580 | 7/1989 | United Kingdom | 361/218 |
| 2226801 | 7/1990 | United Kingdom | 244/1 A |

Primary Examiner—A. D. Pellinen
Assistant Examiner—David Osborn
Attorney, Agent, or Firm—Cushman, Darby & Cushman

[57] ABSTRACT

A lightning resistant composite structure, particularly for aircraft, in which a composite skin panel, for example of carbon fibre, is attached to an inner composite structure by one or more lightning resistant fastener assemblies. The fastener assembly comprises a nut and bolt, the bolt being in good conductive contact with a conductive sleeve engaging the skin panel and a non-conductive sleeve engaging the inner structure. The nut is contained within a capped nut assembly located to the undersurface of the inner structure.

The non-conductive sleeve and the capped nut assembly isolate the inner structure from the effects of lightning strike, the conductive sleeve providing a high quality conductive interface between the bolt and the skin panel. By this means adverse penetration of lightning current into the inner structure is prevented.

10 Claims, 1 Drawing Sheet

LIGHTING RESISTANT COMPOSITE STRUCTURES

BACKGROUND OF THE INVENTION

1. Field of the Invention

This invention relates to composite structures and more particularly although not exclusively carbon fibre composite structures utilising bolted attachments which are particularly susceptible to the injurious effects of lightning strikes. It is particularly described in the context of carbon fibre composite aircraft structures but is not exclusive to such an application.

2. Description of the Related Art

There is an inherent problem when lightning strikes attachment bolts in composite fibre structures whose heads are external to or countersunk within the outer structural layer, for example an aircraft wing skin. One important application is that of a carbon fibre wing structure, particularly a 'wet wing' forming an integral fuel tank. In an adverse situation with a conventional nut and bolt attachment, lightning striking the bolt head, which would generally be flush countersunk into the wing outer surface, could result in arcing at the interface between the nut and bolt and local structure which could at the least cause degradation of the composite material but, in the worst case could ignite fuel vapour with catastrophic results.

One known arrangement of lightning resistant fastener is described in British Patent Application Number 2,212,580A. the fastener, used for joining an aircraft skin panel of composite material to a sub-structural member comprises a countersunk headed bolt and a capture nut wherein the bolt has a head surface region of an electrically conductive material for contacting the outer plies of the skin panel and a shank surface region coated with a layer of electrically insulating material for contacting the inner plies of skin panel and the substructural member, whereby lightning is conducted and dissipated controllably without arcing into the aircraft structure. It does not, however, provide passageway means for the passage of pressurized gases to atmosphere generated from the composite material when the assembly is subjected to lightning strike.

European Patent Application Number 248122 similarly describes a lightning protection system for conductive composite material structures and includes a fastener assembly in which the bolt is surrounded by and fits tightly within an expanded sleeve to provide good electrical contact between the bolt and the skin panel. In alternative embodiments the sleeve is either a one piece component extending over the depth of the structural assembly or two separate sleeve portions. This principle of intimate contact of the sleeves with both portions of composite structure differs from the present invention where the arrangement ensures non-conductivity to the inner structural element. Furthermore, this prior art arrangement makes no provision for the escape of pressurized gas to atmosphere generated when the composite material is subject to lightning strike. It is considered that this shortcoming increases the risk of the gases entering the volatile atmosphere in a fuel tank installation.

SUMMARY OF THE INVENTION

It is the object of the present invention to provide a solution to this shortcoming, the principal objectives being:

a) to prevent lightning current from passing from the bolt head into the nut, b) to prevent lightning current passing from the bolt shank into the innermost structural elements of the bolted composite, c) to ensure quality conduction into the outer element or elements of the bolted composite structure, d) to provide a flow path for venting to atmosphere pressurized gases and debris arising from generated heat during a lightning strike.

According to the present invention there is provided a lightning strike resistant bolted joint in a composite material structure in which an outer composite material skin panel is joined to an inner composite material structure by at least one conductive fastener assembly, said fastener assembly comprising a capped nut assembly, located to the undersurface of the inner structure and including a di-electric nut-retaining cap and a flanged end cap for retaining a nut, a bolt, a non-conductive sleeve and a conductive sleeve concentric with and retained by said bolt, said non-conductive sleeve inserted within the inner structure and the conductive sleeve inserted within the outer skin panel, the arrangement being such that if lightning strikes the installed bolt, the di-electric cap and the non-conductive sleeve will isolate the inner structure from the effect of lightning current flows and the conductive sleeve will provide a high quality conductive interface between the bolt and the outer skin panel, thereby providing an efficient lightning current flow path and in combination preventing adverse penetration into the inner structure.

BRIEF DESCRIPTION OF THE DRAWINGS

One embodiment of the invention will now be described, by way of example only, and with reference to the accompanying drawings in which.

DETAILED DESCRIPTION OF THE PRESENTLY PREFERRED EMBODIMENTS

Figure 1:
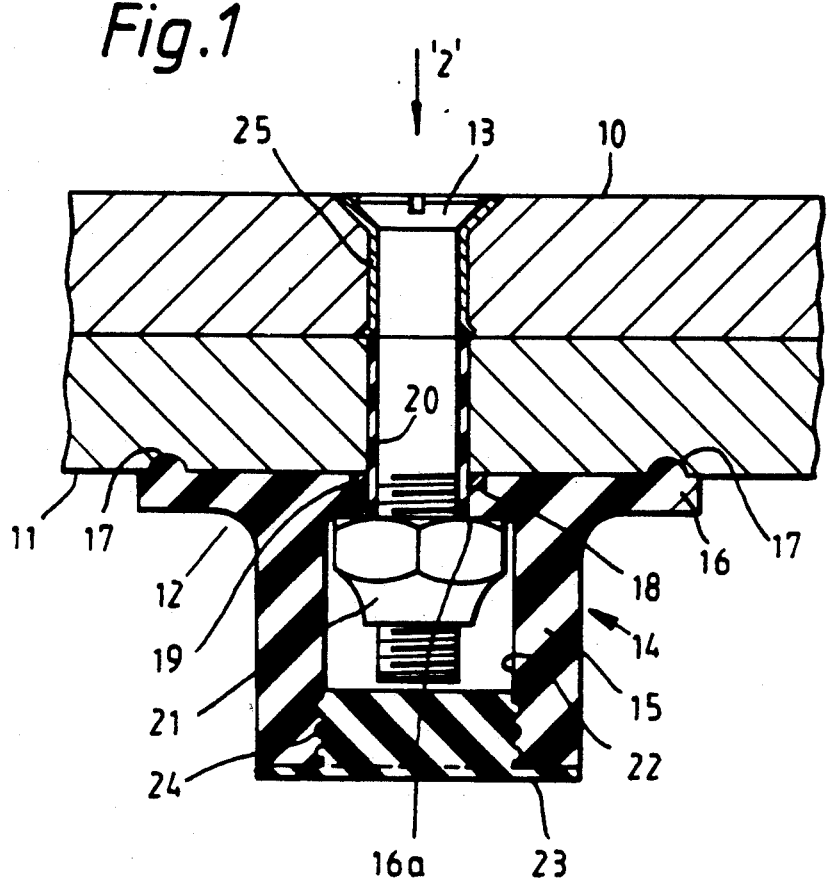
FIG. 1 is a sectional side elevation through a lightning strike resistant bolted joint for a carbon fibre composite structure according to the invention.
Figure 2:
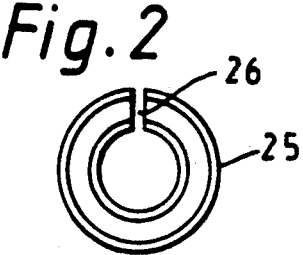
FIG. 2 is a plan view on the conductive sleeve viewed in direction of Arrow '2' in FIG. 1.

Referring to the drawings, a bolted joint arrangement is shown comprising carbon fibre composite skin panel 10, and a composite support structure 11 joined together by means of a fastener assembly 12, itself comprising a countersunk headed bolt 13 engaging a capped nut assembly 14. The capped nut assembly includes a moulded cap 15 of suitable dielectric material and is circular in cross-section with a concentric flange 16 including on its base surface protrusions 17 for engaging the lower surface of panel 11 to prevent rotation. It also includes a base region for maintaining separation of the nut from the undersurface of the inner structure. Alternatively, in a situation such as a releasable panel assembly, the moulded cap may be permanently fixed to the panel 11 by attachment means such as rivets (not shown). In this embodiment the base surface includes an annular groove 18 in which is located a sealing ring 19 to prevent fuel leakage in an aircraft fuel tank installation. The groove 18 and sealing ring 19 are concentric with and lie closely adjacent a vertical sleeve 20 which is integrally moulded as part of the cap 15. In this arrangement the length of the sleeve is equivalent to the thickness of the panel 11. To allow for insertion and retention of the nut 21 the cap includes a concentric bore 22 configured to restrain the nut against rotation when the bolt is being turned. For example, a least part of the base 22 could be moulded in hexagonal form. To prevent loss of the nut when the bolt is not engaged the bore 22 is closed off by a flanged and cap 23 which is a press fit by means of co-operating grooves and serrations 24. Further included in the fastener assembly is a conductive metallic sleeve 25 formed to receive the countersunk headed bolt 13. This sleeve is retained within the panel 10 by locally deforming at its lower end.

The present invention as exemplified by this particular embodiment provides insulation to the nut 21 and the support structure, thus preventing the passage of lightning current from the bolt into the inner structural panel. At the same time however the conductive metallic sleeve 25, which is preferably of titanium provides a high quality conductive interface between the bolt and the external skin panel 10, thus providing an efficient flow path for the lightning current preventing adverse penetration into the inner structural joint.

The metallic sleeve (25) includes a lengthwise slot (26) which will allow gases and debris produced as a result of generated heat during the lightning strike to be vented safely to atmosphere.

As an alternate arrangement the vertical sleeve 20 may be manufactured as a separate component from the moulded cap. This would allow for a range of sleeve lengths to be used to suit different component thicknesses. An integrally moulded sleeve may present difficulties in this regard requiring either a wide range of moulded caps to suit variations in panel thickness or a single moulded cap having an elongate sleeve cut down to suit a particular panel thickness. This would be undesirable for a number of reasons.

I claim:

1. A lightning strike resistant bolted joint in a carbon fiber composite structure in which a first structure made of composite material is joined to a second structure made of composite material by at least one fastener assembly, said at least one fastener assembly comprising:
   a bolt having a tapered head at one end and a threaded portion at another end, said bolt being countersunk into said first structure;
   a di-electric nut retaining cap positioned on an undersurface of said second structure;
   a captive nut engaging said threaded portion, said captive nut being located within said di-electric nut retaining cap;
   a conductive sleeve disposed within said first structure and surrounding a portion of said bolt shank; and
   a non-conductive sleeve in longitudinal alignment with said conductive sleeve, said non-conductive sleeve being disposed only within said second structure and not in said first structure and surrounding a portion of said bolt shank;
   wherein when lightning strikes said bolt, said di-electric nut retaining cap and said non-conductive sleeve isolate said second structure from injurious effects of lightning current flows and said conductive sleeve provides a high quality conductive interface between said bolt and said first structure, thereby providing an efficient lightning current flow path and preventing adverse lightning current penetration into said second structure.

2. A bolted joint according to claim 1, said conductive sleeve comprising:
   a longitudinal slot extending over at least a portion of its length for providing a flow path to allow gas and composite material debris produced as a result of heat generated during a lightning strike to be vented external to said joint.

3. A bolted joint according to claim 1, wherein:
   said non-conductive sleeve is integrally molded with said di-electric nut retaining cap.

4. A bolted joint according to claim 3, said di-electric nut retaining cap comprising:
   a base region for maintaining separation of said nut from said undersurface of said inner structure; and
   a bore engaging said nut with grooves in said bore corresponding to serrations on said nut to prevent rotation of said nut.

5. A bolted joint according to claim 1, said di-electric nut retaining cap comprising:
   a base region for maintaining separation of said nut from said undersurface of said inner structure; and
   a bore engaging said nut with grooves in said bore corresponding to serrations on said nut to prevent rotation of said nut.

6. A lightning strike resistant bolted joint in a carbon fiber composite structure in which a first structure made of composite material is joined to a second structure made of composite material by at least one fastener assembly, said at least one fastener assembly comprising:
   a bolt having a tapered head at one end and a threaded portion at another end, said bolt being countersunk into said first structure;
   a di-electric nut retaining cap positioned on an undersurface of said second structure;
   a captive nut engaging said threaded portion, said captive nut being located within said di-electric nut retaining cap;
   a conductive sleeve disposed within said first structure and surrounding a portion of said bolt shank, said conductive sleeve comprising venting means for dispersing, external to said joint, gas and composite debris generated as a consequence of lightning strikes; and
   a non-conductive sleeve in longitudinal alignment with said conductive sleeve, said non-conductive sleeve being disposed only within said second structure and not in said first structure and surrounding a portion of said bolt shank;
   wherein when lightning strikes said bolt, said di-electric nut retaining cap and said non-conductive sleeve isolate said second structure from injurious effects of lightning current flows and said conductive sleeve provides a high quality conductive interface between said bolt and said first structure, thereby providing an efficient lightning current flow path and preventing adverse lightning current penetration into said second structure.

7. A bolted joint according to claim 6, wherein:
   said conductive sleeve further comprises a tapered portion to conform to the head of said bolt; and
   said venting means comprises a longitudinal slot extending over at least a portion of the length of said conductive sleeve.

8. A bolted joint according to claim 6, wherein:
said non-conductive sleeve is generally molded with said di-electric nut retaining cap.

9. A bolted joint according to claim 8, said di-electric nut-retaining cap comprising:
    a base region for separating said nut from said undersurface of said second structure.;
    restraining means for preventing rotation of said nut when said bolt is turned; and
    di-electric closure means for closing off said nut-retaining cap when said nut is installed.

10. A bolted joint according to claim 6, said di-electric nut-retaining cap comprising:
    a base region for separating said nut from said undersurface of said second structure;
    restraining means for preventing rotation of said nut when said bolt is turned; and
    di-electric closure means for closing off said nut-retaining cap when said nut is installed.

* * * * *